United States Patent [19]

Stricker

[11] 4,170,751
[45] Oct. 9, 1979

[54] ELECTRONIC CONTROL FOR A MECHANIZED SPRAY PAINTING SYSTEM

[75] Inventor: Ira J. Stricker, Warren, Mich.

[73] Assignee: General Motors Corporation, Detroit, Mich.

[21] Appl. No.: 874,487

[22] Filed: Feb. 2, 1978

[51] Int. Cl.² .............................................. G05B 9/02
[52] U.S. Cl. ................................... 318/563; 318/257; 318/627; 318/603; 198/341
[58] Field of Search ............... 318/627, 257, 563, 603, 318/565; 214/1 BB, 1 C; 198/256, 258, 259

[56] References Cited

U.S. PATENT DOCUMENTS

| | | | |
|---|---|---|---|
| 3,283,918 | 11/1966 | Devol | 214/1 BB |
| 3,744,032 | 7/1973 | Engelberger | 340/172.5 |
| 3,958,682 | 5/1976 | Martin | 214/1 BB X |
| 4,002,960 | 1/1977 | Brookfield et al. | 318/257 |
| 4,011,437 | 3/1977 | Hohn | 318/568 X |

*Primary Examiner*—B. Dobeck
*Attorney, Agent, or Firm*—Warren D. Hill

[57] ABSTRACT

An industrial robot for spray painting workpieces carried by a conveyor is provided with a control to allow the programmed robot sequence to proceed synchronously with conveyor movement so long as the conveyor maintains a normal speed. When, however, the conveyor stops, the control maintains robot operation until the spray gun is moved to a safe stopping place to avoid excessive paint application to a portion of a workpiece. Upon conveyor start-up, the robot remains stationary until the workpiece approaches normal speed and moves into a position synchronous with the robot position.

1 Claim, 3 Drawing Figures

ELECTRONIC CONTROL FOR A MECHANIZED SPRAY PAINTING SYSTEM

This invention relates to an electronic control for an industrial robot spray painting system.

It is common practice in industry to utilize a computer controlled robot programmed to operate upon a workpiece carried by a conveyor. The operation on the workpiece may comprise welding, part transfer or painting, for example. Typically such systems are synchronized with the conveyor movement so that the sequence of robot operations takes place at a speed proportional to conveyor speed to maintain the desired relative position between the robot and the workpiece. However, in the case of a spray painting operation being performed by a robot manipulated spray gun synchronized with a conveyor carried workpiece, if the conveyor stops while the spray gun is applying paint to the surface, an excessive buildup of paint can occur. A similar heavy paint concentration occurs when conveyor and robot speeds drop to a value considerably below normal. The standard practice of operating a paint spray gun is to scan or traverse the gun back and forth across the workpiece surface with the paint spray pattern passing beyond the edge of the surface or out of range of the workpiece surface at the end of each scan. At the end points, the spray gun is momentarily turned off, then turned on again for the next traverse. It is desirable then to allow the spray gun to stop moving only when the workpiece surface is out of range of the spray pattern and further to prevent the traverse movement of the spray gun from slowing down to a speed where the paint coating becomes thick enough to sag or run.

It is, therefore, a general object of this invention to provide an electronic control responsive to slowing of the conveyor speed below a desired limit to override the programmed synchronous relationship between the robot and workpiece for preventing a relative motion between the spray gun and workpiece which is too slow for proper paint application. It is a further object of the invention to provide in the aforesaid control circuit a way of stopping the spray gun only at its normal spray interruption point beyond the range of the workpiece surface in the event of conveyor stoppage.

The invention is carried out by providing a control responsive to conveyor speed including a speed detector for sensing when conveyor speed drops to a predetermined low value and including a circuit responsive to the low speed event for providing to the robot electrical pulse signals synthesizing a conveyor speed higher than the actual speed to thereby maintain robot operation at a nearly normal speed for a period at least long enough to allow the conveyor to coast down to a full stop; providing a circuit for extending the artificial conveyor speed signal until the spray gun moves out of range of the workpiece and turns off and further providing a counter for counting in one direction the artificial speed pulses which in total represent the programmed robot advancement occurring after the low speed event and thereafter, during conveyor start-up, for counting in the other direction responsive to actual conveyor speed signal pulses to determine when the original counter state is reached and the workpiece has assumed a position in substantial synchronism with the robot programmed position to thereby restart the robot mechanism.

The above and other advantages will be made more apparent from the following specification taken in conjunction with the accompanying drawings wherein like reference numerals referred to like parts and wherein.

Figure 1:
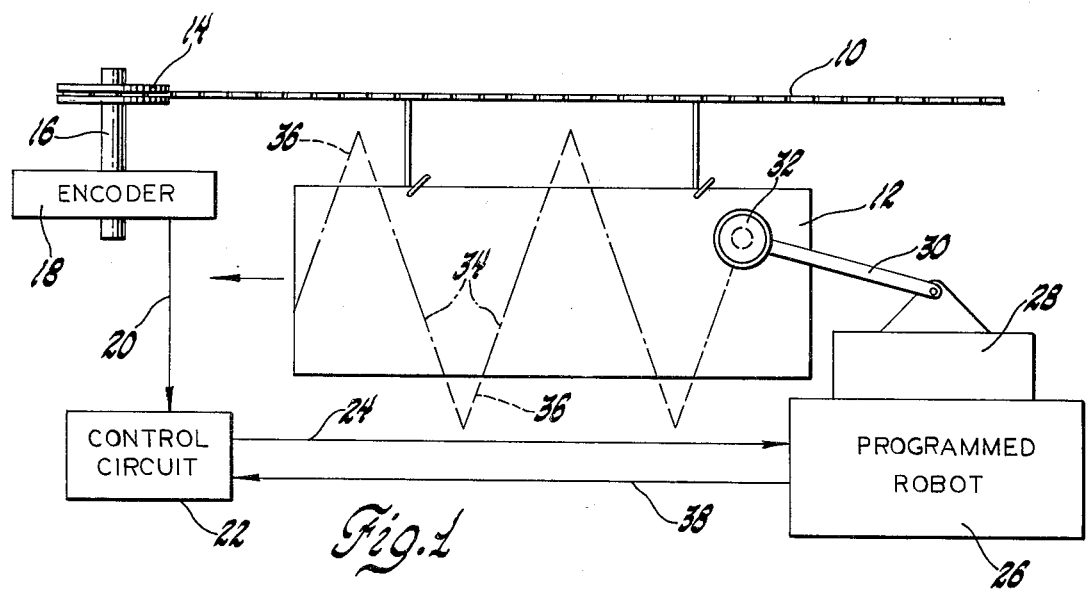
FIG. 1 is a schematic view of a conveyor carried workpiece being spray painted by a programmed robot having a control circuit according to the invention linking the conveyor speed sensing mechanism with the robot.

Referring to FIG. 1, an endless chain conveyor 10 carries a workpiece 12 represented by a flat rectangular panel. As indicated by an arrow, the workpiece is being moved toward the left. The chain 10 passes around a sprocket 14 which turns a shaft 16 driving a pulse generator 18 such as an optical angle encoder which provides a series of square wave pulses having a frequency proportional to conveyor velocity. The pulses are carried by a line 20 to a control circuit 22 which in turn passes along the pulses during normal operation on line 24 to a programmed robot 26. The robot 26 includes a control cabinet representing the base of the robot and an operating mechanism 28 having an extending arm 30 carrying a paint spray gun 32 on its outer extremity.

By scanning vertically across the workpiece 12, under the control of the robot, the spray gun traverses the moving workpiece in a zig zag or W shaped pattern indicated by the broken lines 34. Such a pattern is exemplary, of course, and many other motions such as horizontal traversing are possible according to the program of the robots. Standard spray painting practice, however, dictates that at the end of each sweep or scan the spray pattern is moved beyond the edge of the workpiece and the spray gun is shut off momentarily as indicated by the dotted lines 36 at the extremities of the zig zag pattern 34. It will be understood, of course, that due to the wide fan of the spray pattern the panel will become completely coated in the course of the zig zag motion of the spray gun relative to the workpiece. Programmed robots suitable for spray painting are already well known and are commercially available. One suitable robot is the Trallfa TR3000S system supplied by Trallfa Nils Underhaug A/S which is controlled by a programmed microcomputer. That system has an input terminal for receiving the conveyor speed pulses on line 24 and an output terminal for feeding a gun control signal to line 38. The programmed robot is, therefore, no part of the present invention and is not described in detail. It is necessary merely to point out that the robot is capable of responding to an external pulsed signal on line 24 denoting conveyor speed in order that movements of the robot can be geared to conveyor speed to effect synchronism between the spray gun 32 and the moving workpiece 12. The gun control signal on line 38 is used to turn the spray gun 32 on and off, although the connection to the spray gun is not shown in the drawings.

Figure 2:
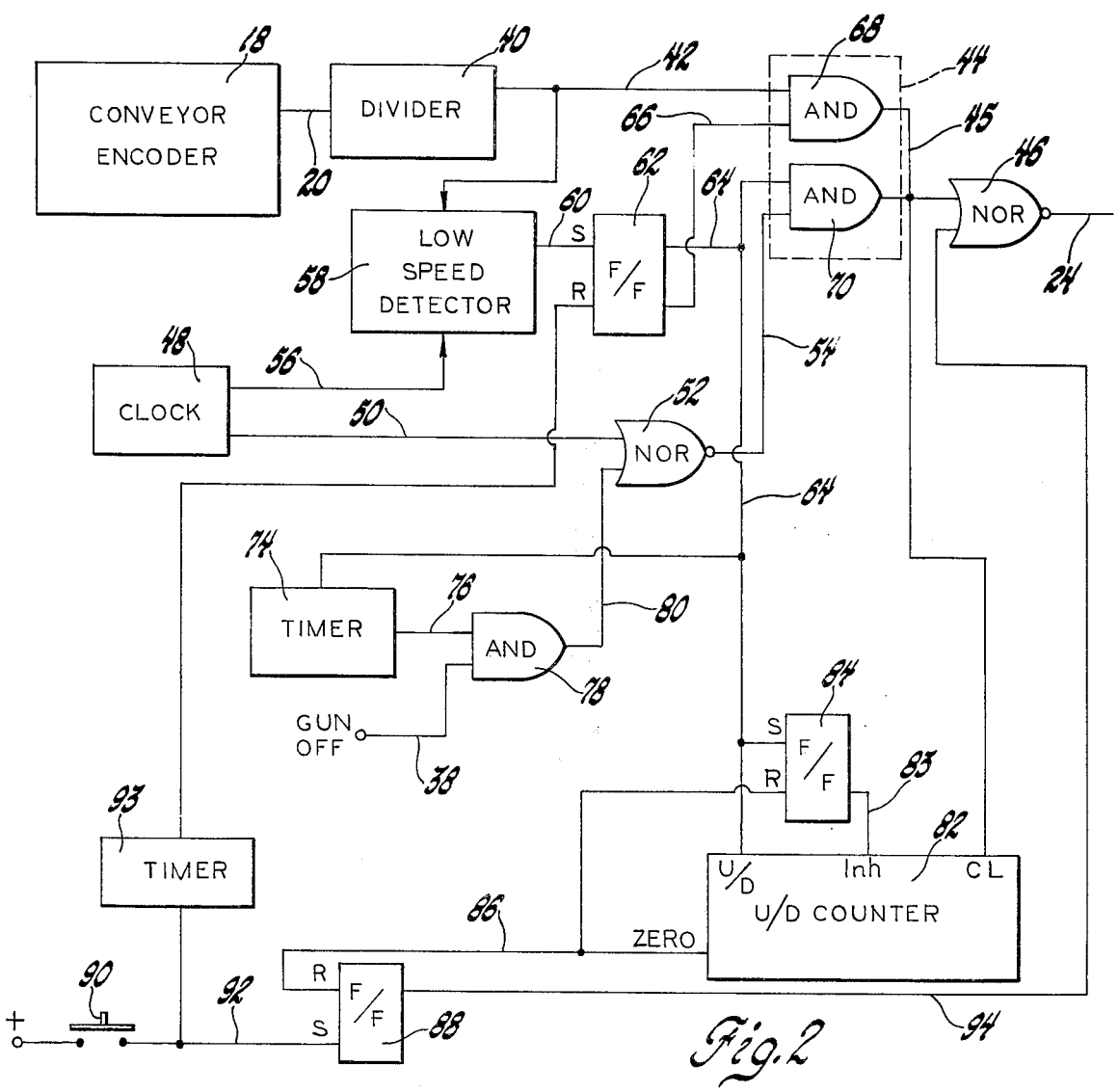
FIG. 2 is a logic diagram of the control circuit of FIG. 1.

FIG. 2 illustrates the control circuit 22 of FIG. 1. The conveyor encoder 18 provides a pulsed output representing conveyor speed at a frequency higher than that compatible with the robot. A digital divider 40 reduces the frequency from the encoder 18 to a value, say, 1,600 pulses per second at normal conveyor speed which is compatible with the robot control. That conveyor speed signal is normally transmitted by a line 42 through a gate 44 and an inhibit gate 46 and line 24 to the robot 26. A clock 48 produces on line 50 a pulsed signal having a frequency on the order of the normal frequency of the conveyor signal on line 42 or preferably a little higher. That clock frequency is selectively passed through a NOR gate 52 and is fed by line 54 to an input of the gate 44.

The clock 48 also produces a reference frequency, say, about 1,000 pulses per second, on line 56. That reference frequency represents a low conveyor speed which is substantially below the normal conveyor speed and indicates that the conveyor is coasting down and that a stoppage is imminent. A low speed detector 58 which comprises a frequency comparator is connected to the lines 42 and 56 to compare the actual conveyor speed signal to the reference signal. When the conveyor speed signal reaches the low speed reference frequency, a pulse is produced on a speed detector output line 60 which is connected to the set input of a flip-flop 62. The flip-flop output on line 64 and the inverse output signal on line 66 are fed to the gate 44 to control the gate function. In the event of a low conveyor speed detection, the line 64 goes positive and remains positive until the reset input of the flip-flop 62 is energized. So long as the reset input remains energized, the flip-flop is immune to any further "set" signals on line 60. The gate 44 is arranged to pass the clock signal on line 54 to the gate output when the line 64 is positive and otherwise will pass the conveyor speed signal on line 42 to the gate output. The gate 44 comprises two AND gates 68 and 70 having a common output line 45. The inputs of AND gate 68 are the conveyor speed signal on line 42 and the inverted output of the flip-flop 62 on line 66. The inputs of the AND gate 70 are the clock signal on line 54 and the flip-flop output on line 64. The outputs of the gate 68 and 70 are fed to an input of the NOR gate 46. Thus, when line 64 is positive, the gate 70 passes the clock signals from line 54; and when the line 66 is positive, the gate 68 is energized to pass the conveyor speed pulses on line 42.

A timer 74 is adjusted to a timed delay interval which is slightly greater than the period required for conveyor stoppage after detection of the low speed signal on line 64. The time delay is empirically determined for any given conveyor installation. The timer 74 is connected to the line 64 for actuation when the conveyor low spped is detected and produces an output signal on line 76 when the delay time expires. The line 76 is connected to the input of an AND gate 78, the other input of which is connected to line 38 of FIG. 1 which carries the gun control signal. When the robot program commands that the paint spray gun 32 be turned off, the line 38 becomes positive. The output of the AND gate 78 on line 80 then becomes positive when the timer 74 times out and the gun "off" signal occurs to disable the NOR gate 52. Then the clock pulses on line 50 will no longer be transmitted to the gate 44 and the robot.

An up/down counter 82 has an up/down input connected to line 64 such that when the low speed signal is present on line 64 the counter is conditioned to count up, and when that signal is absent, the counter is conditioned to count down. An inhibit input of the counter is connected via line 83 to the inverted output of a flip-flop 84 having its set input connected to the line 64 so that normally the flip-flop output inhibits counter operation, but when the line 64 is energized by the low speed signal, the inhibit signal is removed thereby allowing counter operation until a reset signal is applied to the reset input of the flip-flop. A clock input of the up/down counter 82 is connected to the output of the gate 44 on line 45, such that when the counter is enabled, each pulse fed through the gate 44 is registered by the counter. A zero output of the counter 82 on line 86 is energized whenever the counter reaches a zero condition. That line 86 is connected to the reset input of the flip-flop 84 thereby inhibiting counter operation after a zero condition occurs.

The line 86 is also connected to the reset input of a flip-flop 88. A set input of the flip-flop 88 is activated by closing a conveyor start switch 90. The conveyor start switch is also connected by line 92 and a timer 93 to the reset input of the flip-flop 62. The timer 93 maintains the signal to the reset input of the flip-flop 62 for a preset period, say 2.5 seconds, to prevent the flip-flop 62 from responding to a low speed detector output signal during conveyor start-up. The output of the flip-flop 88 is connected to an input of the NOR gate 46.

When the conveyor start switch 90 is closed to activate the set input of the flip-flop 88, the output is energized to inhibit the passage of signals from line 45 through the NOR gate 46 to the robot 26. At the same time the flip-flop 62 is reset to change the state of energization of line 64 so that the up/down counter 82 is conditioned to count down. The conveyor speed signals on line 42 then will be passed through the gate 44 and line 45 to the clock input of the up/down counter so that the counter will count down toward zero. When zero is attained, the flip-flop 88 is reset to remove the signal from its output on line 94 thereby enabling the NOR gate 46 to pass the conveyor speed signal to the robot.

Figure 3:
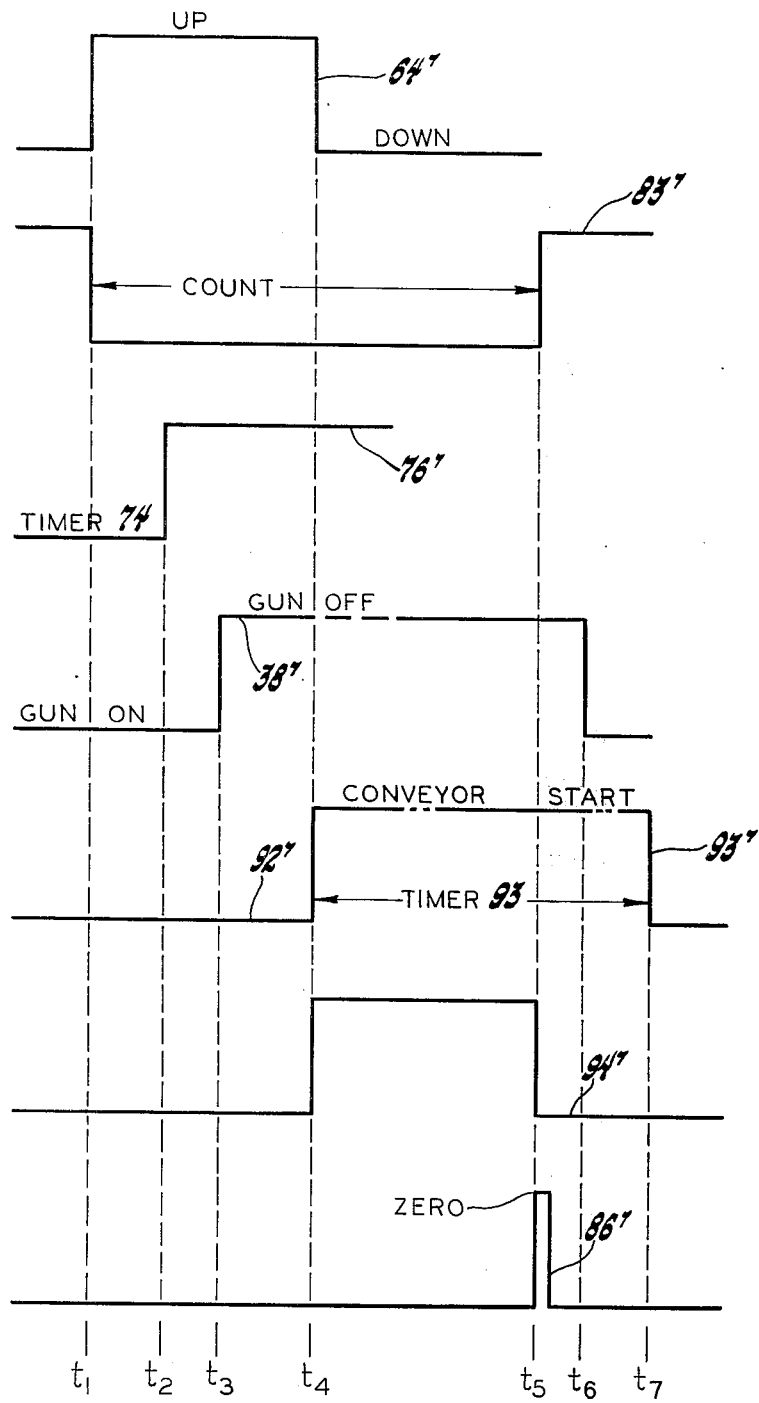
FIG. 3 is a set of logic signal waveforms illustrating the timing of events occurring within the control circuit.

The operation of the control circuit of FIG. 2 is illustrated by reference to FIG. 3 which is a group of waveforms illustrating signals occurring in the control circuit. Each signal is indicated by a primed numeral referring to a corresponding circuit conductor or element. If during a spray painting operation the conveyor slows down to a value equal to the reference value on line 56, the low speed detector 58 senses the low speed such that the flip-flop 62 is operated to produce the low speed signal 64' at time $t_1$. That signal conditions the up/down counter 82 to count up and indirectly through the flip-flop 84 removes the inhibit signal 83' from the counter so that the counter is enabled to count. The signal 64' also conditions the gate 44 to pass the clock signal from line 54 to the robot. The clock signal which has a frequency representing normal conveyor speed or a slightly higher speed maintains a proper rate of traverse by the spray gun even though the conveyor is moving at a very low speed. Such movement of a spray gun avoids the excessive buildup of paint which would occur if the spray gun were to slow down too much when conveyor speed decreases.

At time $t_2$ the timer signal 76' indicates that the time delay has elapsed thereby indicating that the conveyor has had sufficient time to stop. Thereafter, at time $t_3$ the signal 38' emitted by the robot 26 indicates that the spray gun has passed beyond the edge of the workpiece and has been signalled to turn off. At that point the NOR gate 52 is disabled so that no clock pulses can be delivered to the up/down counter 82 or to the robot 26. That condition represents a zero conveyor speed to the robot and causes the robot to stop.

The number stored in the counter at point $t_3$ represents the amount of the programmed robot advancement occurring after the point of low speed detection. Since the robot has experienced normal movement through its programmed sequence while the conveyor was moving very slowly, or was stopped the robot has advanced to a point in the program ahead of the workpiece carried by the conveyor. It has been verified by experience that the numbers stored in the counter also represent the distance required for the conveyor to accelerate to a position at which it is roughly in synchronism with the robot again. Thus, the stored information in the counter will be used to control the activation of the robot after conveyor start-up. When the conveyor start switch 90 is closed at time $t_4$, the signal 92' resets the flip-flop 62 thereby changing the state of the signal 64' such that it conditions the up/down counter to count down. The flip-flop 88 is set at the same time to provide an inhibit signal 94' which disables the NOR gate 46 thereby preventing robot operation while the conveyor is accelerating and the counter is counting down. When, however, at time $t_5$ the counter reaches a zero value indicating that the stored count value has elapsed, the signal 86' resets the flip-flop 88 to enable the NOR gate 46 so that conveyor speed signals from line 42 are passed to the robot to begin robot movement in synchronism with the workpiece movement. At time $t_6$ when the spray gun is moved from its parked position to the point where it is programmed to be turned on, the signal 38' changes state to effect turn-on. The zero signal 86' also resets the flip-flop 84 to reapply the inhibit signal 83' to the up/down counter thereby preventing any further counter operation until another low speed detection occurs. At time $t_7$ the timer 93 times out. It has had the effect of holding the flip-flop 62 in reset state since the start signal 92' to prevent the flip-flop 62 from responding to the low speed detection which must occur at conveyor start-up. After the time $t_6$ the reset signal 93' is removed.

It will thus be seen that the control according to the invention provides an override of the conveyor robot synchronism to prevent the spray gun operated by the robot from slowing down when the conveyor slows down excessively which would result in excessive buildup of paint on a portion of the workpiece. The control, on the other hand, causes the robot to carry the spray gun through its normal sequence at a substantially normal speed until the conveyor has stopped and the spray gun has turned off while in a position directing the spray away from the workpiece; and finally upon conveyor start-up to allow conveyor movement to catch up with the robot position to establish substantial synchronism. It will be understood that for the particular type of traverse movement described herein the short period of nonsynchronism between the spray gun and the workpiece will cause upon start-up workpiece movement while no spray painting is taking place, however, that span is very short and the normal overlap of the paint spray during successive sweeps across the workpiece adequately covers the gap.

The embodiments of the invention in which an exclusive property or privilege is claimed are defined as follows:

1. A control for a mechanized spray painting system, the system having a conveyor subject to stoppages for carrying workpieces to be painted, a programmed robot for repeatedly traversing a spray gun across a workpiece surface and beyond, the robot having a conveyor speed input and including programmed control means to normally operate the robot in a set sequence at a rate and position dependent on the conveyor speed and synchronized with workpiece position, said programmed control means operative to develop a gun signal to turn on said spray gun before said gun is directed toward the workpiece surface and to turn off said gun when it is directed away from the surface to be painted, a conveyor speed encoder for supplying to the conveyor speed input an electrical conveyor speed signal having a pulse frequency proportional to conveyor speed, and means for modifying the frequency of the signal delivered to the speed input during conveyor stopping and starting comprising a low speed detector responsive to the said conveyor speed signal for sensing a preset low speed of said conveyor indicative of impending conveyor stoppage and issuing a corresponding low speed signal, means including gate means responsive to the low speed signal for supplying to the speed input of said robot a clock frequency representing a speed higher than the preset low speed to maintain a substantially normal spray gun traverse rate during conveyor coastdown, clock frequency termination timer means responsive to the said gun signal and to a signal having a predetermined time duration for terminating the clock frequency to the speed input of said robot when the spray gun is turned off and after a period sufficient for conveyor stoppage has elapsed, thereby allowing the programmed sequence of the spray gun to continue a small amount after the conveyor stops and causing the spray gun to stop where it is directed away from the surface of the workpiece, an up/down counter enabled by the low speed signal for counting in one direction from an initial state the pulses of the clock frequency supplied to the speed input of said robot, means responsive to conveyor start-up for resetting the low speed detector to terminate the low speed signal and causing the up/down counter to count the pulses of the conveyor speed signal in the other direction, and further means responsive to conveyor start-up for inhibiting the supply of the conveyor speed signal to the speed input of said robot until the counter returns to its initial state whereby the conveyor returns toward normal speed and the workpiece advances while the spray gun is idle to substantially synchronize the workpiece position with the spray gun pattern whereupon the robot continues its set sequence at the rate dictated by the conveyor speed.

* * * * *